(No Model.)

L. BLOCK.
APPARATUS FOR PREPARING WATER FOR THE MANUFACTURE OF ICE.

No. 529,356.  Patented Nov. 20, 1894.

Witnesses:
Charles R. Searle
M. J. Boyle

Inventor.
Louis Block

UNITED STATES PATENT OFFICE.

LOUIS BLOCK, OF NEW YORK, N. Y.

APPARATUS FOR PREPARING WATER FOR THE MANUFACTURE OF ICE.

SPECIFICATION forming part of Letters Patent No. 529,356, dated November 20, 1894.

Application filed April 13, 1894. Serial No. 507,377. (No model.)

*To all whom it may concern:*

Be it known that I, LOUIS BLOCK, a citizen of the United States, residing in the city and county of New York, in the State of New York, have invented a certain new and useful Improvement in Apparatus for Preparing Water for the Manufacture of Ice, of which the following is a specification.

My invention applies to all that class of ice-making apparatus in which the refrigerating effect is produced by the evaporating of a liquid, of which ammonia is for various reasons the most frequently used, and which vapor after each use is again mechanically compressed and the heat of compression removed so that it again assumes the liquid form and can be re-used for any number of times.

I will describe the invention as carried out with the use of ammonia.

A certain amount of mechanical power is required for the manufacture of a given quantity of ice. When the power is obtained from steam-engines, the water which has been evaporated to produce the steam therefor, and for the several steam-pumps and the reboiling operation which seems to be necessary, all of which steam can be reduced to the form of water by subsequent cooling, may be made available to furnish a portion of the water which is required for the manufacture of the ice; but sufficient water is not thus obtained to manufacture all the ice unless by the use of engines which use the steam wastefully.

I have discovered that it is practicable to use the most economic steam power,—large engines of the best type, compound, receiving the steam at a high pressure, with high expansion, and triple or quadruple compounding if desired, delivering the exhaust from the last and largest cylinder at a pressure considerably below the atmosphere, and yet obtain by condensing and purifying the water directly obtainable therefrom, and a reuse, one or more times, of the heat obtained therefrom in the act of condensing, the distillation of a further quantity which added to the other will supply sufficient water to produce all the ice. I provide for separating the oil from that portion of the water which is condensed from the steam which has passed through the engine.

My invention gives from river water of ordinary condition distilled and purified water for the entire quantity of ice.

The accompanying drawings form a part of this specification and represent what I consider the best means of carrying out the invention.

Figure 1:
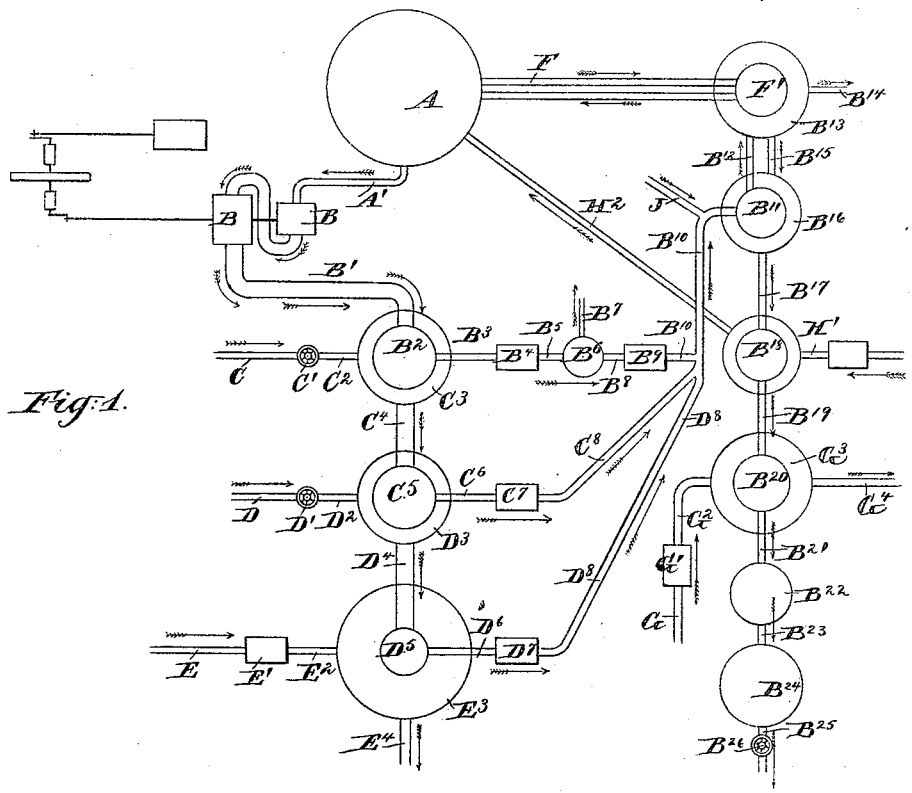
Figure 2:
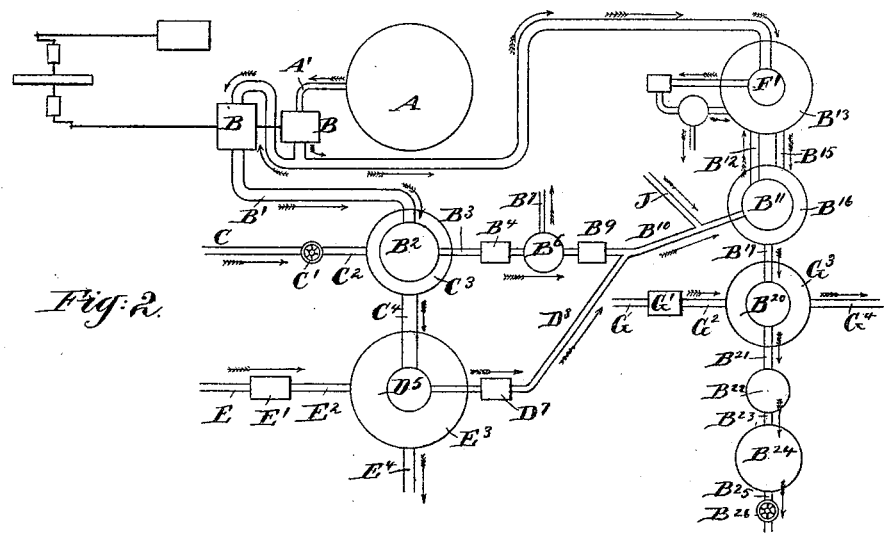

Figure 1 is a diagram showing in plan the due relations of the several parts of the apparatus. Fig. 2 is a corresponding diagram showing a modification.

Similar letters of reference indicate corresponding parts in both the figures where they appear.

A is the boiler supplying steam at a sufficiently high pressure, and A' the pipe leading therefrom to a compound steam-engine B, shown as a tandem. It drives a compressor, which, and the provisions for the subsequent use of the ammonia in producing the ice may be of any ordinary or suitable character.

B' is the exhaust pipe through which the steam after its expansion to an economically low tension in the compound engine is led to coils $B^2$, arranged to serve by the presentation of water thereto, circulating at a sufficiently lower pressure, to perform the double functions of a condenser for the steam received from the engine and the evaporation of the condensing water at a pressure so much less than that of the exhaust steam from the engine as will attain a sufficiently vigorous evaporating action in the apparatus. The water produced by the condensation of the steam in the coil $B^2$ is taken away through a pipe $B^3$, by the aid of an air-pump $B^4$ and delivering pipe $B^5$, to a separating vessel $B^6$ of sufficient capacity and properly arranged to allow the oil to rise to the surface and be discharged through an overflow pipe $B^7$. The water and oil after passing the air-pump $B^4$ are under the ordinary pressure of the atmosphere. The pure water is taken from a lower point in this separating vessel through the pipe $B^8$, and by means of a pump $B^9$ is delivered through a pipe $B^{10}$.

The condensing water may be ordinary river water. It is admitted through the pipe C, controlled by the cock C', and is delivered through the pipe $C^2$ into the vessel $C^3$ surrounding the coils $B^2$. The coils $B^2$ and inclosing vessel $C^3$, both under a partial vacuum but with the pressure and consequently the temperature in the coils sufficiently in excess to induce an active transfer of heat therefrom into the surrounding water, I refer to collectively, when necessary, as the first condenser and evaporator. The condensing water maintained under a sufficient vacuum in the vessel $C^3$, becoming heated by the coils, produces vapor which is led away through the pipe $C^4$ and introduced into a second set of coils $C^5$ in a second vessel $D^3$. These coils $C^5$ present sufficient surfaces, properly conditioned, to transfer the heat in the same manner as in the first condenser and evaporator. The water produced by the condensation of the vapor in the coils $C^5$ is taken out through the pipe $C^6$ by means of an air-pump $C^7$ and delivered through a pipe $C^8$ against the pressure of the atmosphere. This water, unlike that from the coils $B^2$, does not require any treatment to remove oil, because it has been made by evaporation of water without passing through an engine.

The river water introduced to effect the condensation in the coils $C^5$ is admitted under the same conditions as the water which effected the condensation in the coils $B^2$, except that the conditions are so adjusted that its pressure shall be lower. The water is admitted through the pipe D, controlled by the cock $D'$, and flows through the pipe $D^2$ at a sufficiently low pressure into the vessel $D^3$ and absorbs the heat from the coils $C^5$. The action in this second condenser and evaporator is the same as that in the first condenser and evaporator, except that the pressures and temperatures in the several parts are lower; that is to say, the vapor in the coils $C^5$ is at a lower pressure than that in the coils $B^2$ and requires a lower temperature to effect its condensation. The water is admitted through the cock $D'$ in sufficiently liberal quantities to maintain the required lower temperature in the vessel $D^3$, but the temperature in this second condenser and evaporator will, if the cock $D'$ be rightly adjusted, be sufficient to generate vapor which is made available. This is the last use of the heat. This attenuated vapor flows through the pipe $D^4$ into coils $D^5$ where its heat is taken out by sufficient cold water circulating in the vessel $E^3$ and is condensed.

The water produced by the condensation in the coil $D^5$ is taken out through the pipe $D^6$ by means of an air-pump $D^7$, and delivered through a pipe $D^8$ to mingle in its turn with the distilled water from the air-pumps $B^4$ and $C^7$, previously described. The water to effect the final condensation is allowed to remain under the ordinary pressure of the atmosphere. It is drawn in through the pipe E by means of a circulating pump $E'$, and is delivered through the pipe $E^2$, circulated in the vessel $E^3$ in such liberal quantities that it does not become materially warmed, and is discharged again into the river through the pipe $E^4$.

The several air-pumps and other pumps require power. The pump which takes the condensed water requires but little power because the pressure within is nearly equal that of the atmosphere. The pumps which take the water from the second and third require more power because the chambers from which the water is to be pumped are at lower pressure. The power may be supplied by any proper train of connections as shafting and belting from the compound engine B, or they may each be worked by separate engines. In this latter case, the steam required to drive them is led into the apparatus at the nearest or most convenient point, and contributes its heat and water to the total sum available.

The water from the four sources,—first, that produced by the condensation of the steam used in the engine, and drawn out by the air-pump $B^4$, having its oil separated in the vessel $B^6$; second, that produced by the vapor of the condensing water in the vessel $C^3$ by its condensation in the coils $C^5$, and its removal by the air-pump $C^7$; third, the additional distilled water produced at a still lower temperature from the water admitted through the pipe D, evaporated in the vessel $D^3$, condensed again in the coil $D^5$, and drawn out at a lower pressure by the air-pump $D^7$, and, fourth, that produced by the condensation of any other steam available received through one or more pipes J, is collected into and delivered through the pipe $B^{10}$ into an apparatus which may be any of the well known forms of heat exchangers adapted to absorb heat from boiling water to which it is presented, and to thereby have its own temperature raised to very near the boiling point. I have represented this heat exchanger as a simple concentric vessel, the water received from the pipe $B^{10}$ being held in the interior vessel $B^{11}$, and the warmer water from a source to be presently described circulating in the annular space $B^{16}$, exterior thereto. The distilled water from all the sources being previously partially heated in the heat exchanger, moves through the pipe $B^{12}$ into the re-boiling vessel $B^{13}$, where it is heated by coils $F'$, as will presently appear, and is held in an actively boiling state and discharges its air with a little steam into the atmosphere through the pipe $B^{14}$. The boiled water now returns through the pipe $B^{15}$, and circulates in the portion $B^{16}$ of the heat exchanger. Here it gives up much of its heat to the incoming water in the central vessel $B^{11}$, and moves through the pipe $B^{17}$ into a feed heater $B^{18}$, receiving the feed water through one pipe $H'$ and delivering it through another, $H^2$, which latter conducts it to the boiler A. This feed heater $B^{18}$ may be of any ordinary or suitable character equipped with tubes or analogous provisions presenting liberal heating surfaces H to receive and convey as much as possible of the heat to the feed water.

The nearly cooled water for ice manufacture is not led through a pipe $B^{19}$ into a water cooler $B^{20}$. This, it will be understood, may present a large amount of thin metal surface in coils or other convenient form. I have represented it simply as a cylindrical vessel. The cooled water flows through the pipe $B^{21}$, into a deodorizer $B^{22}$. Here it is brought into contact with a sufficient quantity of triple-burned charcoal. From this it moves in a pure and cool condition through the pipe $B^{23}$ into a cold storage tank $B^{24}$, from which it is delivered when required through the pipe $B^{25}$, controlled by the cock $B^{26}$ to fill the several cans, not shown, in which it is subsequently frozen in the ordinary manner.

The water to effect the cooling in the cooler $B^{20}$ may be any water which is available at a sufficiently low temperature. It enters through the pipe G, is circulated by the pump G', flows through the pipe $G^2$, circulates in the annular space, or other space or spaces, in the cooler $G^3$, and is discharged through the pipe $G^4$.

I have shown the steam to effect the re-boiling in the coils F' as received directly from the boiler A, through the pipe F. The high pressure and temperature of this steam will cause it to act rapidly in effecting the re-boiling, but if there is sufficient surface, this steam may be taken from the connection between the high pressure and low pressure parts of the compound engine. The water condensed in the coil F' is allowed to return by gravity, the re-boiler $B^{13}$ being sufficiently higher than the boiler A, and the connection being properly arranged to allow such return.

J is a pipe bringing water which has been condensed from any of the other engines or users of steam about the establishment, after it has been properly purified, and causing it to contribute still further to the distilled water to be used for the ice manufacture.

My invention is intended to supply pure water for the manufacture of all the ice, and to attain this end without the necessity of any extravagant use of steam.

Modifications may be made without departing from the principle or sacrificing the advantages of the invention. The forms and proportions of the several parts may be varied within wide limits. Instead of a single boiler there may be a battery of boilers of any ordinary or suitable style. Instead of a single compound engine, there may be a double or triple compound. Instead of tandem they may be cross compound. The several vessels and coils may be varied indefinitely in their forms.

Parts of the invention can be used without the whole. I can dispense with the second condenser and evaporator and use only the first condenser and evaporator, and the final condenser $D^5$, $E^3$, which serves as a condenser alone. Fig. 2 is a diagram showing such. This also shows the steam for the re-heating taken from the connection between the high pressure and the low pressure cylinders of the compound engine. This arrangement allows the steam for the re-boiling to generate mechanical power in the high pressure cylinder, still retaining sufficient pressure and temperature to be effective in the re-boiling. In this last arrangement the water resulting from the condensation of such steam is trapped out, treated to purify it and then mingled with the water distilled in the other parts of the apparatus.

I claim as my invention—

1. In ice-making plant the combination with a steam generator of apparatus as the vessel $C^3$ and coil $B^2$ performing the double function of a condenser and an evaporator, an air pump for removing the condensed water therefrom at the exhaust pressure, a pipe for removing the vapor generated from the condensing water at a lower pressure than that of the exhaust steam, a condenser in which such secondary vapor is condensed, and a second air pump distinct from the first, operating to remove the resulting water against a stronger vacuum than obtains in the first, and provisions as the pipe $C^8$ $B^{10}$ for adding together the water from both sources to be subsequently treated to produce the ice, all substantially as herein specified.

2. In ice-making plant the combination with a steam generator of apparatus as the vessel $C^3$ and coil $B^2$, performing the double function of a condenser and an evaporator, an air pump for removing the condensed water therefrom at the exhaust pressure, a pipe for removing the vapor generated from the condensing water at a lower pressure than that of the exhaust steam, a condenser in which such secondary vapor is condensed, and a second air pump distinct from the first, operating to remove the resulting water against a stronger vacuum than obtains in the first, and provisions as the pipe $C^8$ $B^{10}$ for adding together the water from both sources and subsequently passing all the distilled water from these and any other sources available through a single set of apparatus comprising a heat exchanger, re-boiler, feed heater, cooler and deodorizer, ready for introduction into the refrigeratory apparatus for the production of pure ice at moderate cost, all substantially as herein specified.

3. In ice making plant the combination with a steam generator of apparatus as the vessel $C^3$ and coil $B^2$ performing the double function of a condenser and an evaporator, an air pump for removing the condensed water therefrom at a low pressure, and an intermediate pipe for removing the vapor generated from the condensing water at a lower pressure, another apparatus performing also the double function of a condenser and evaporator in which such secondary vapor is condensed, a second air pump operating to remove the resulting water, and provisions as the pipe $C^8$ for conducting away such water, a condenser proper in which the third vapor is condensed, and a final air pump operating to remove the resulting water and any remaining thin vapor and air at the lowest pressure, and provisions as the pipe D⁸ for conducting it away, and provisions for adding the water due to such condensation of the third vapor to that produced from the condensation of the secondary vapor and of the original steam and also that obtainable from the condensation of other steam available and thus obtaining distilled water from all these sources to be subsequently treated to produce ice, all substantially as herein specified.

In testimony that I claim the invention above set forth I affix my signature in presence of two witnesses.

LOUIS BLOCK.

Witnesses:
CHARLES R. SEARLE,
M. F. BOYLE.